April 20, 1937. K. E. LYMAN 2,077,487
AUTOMATIC FREEWHEEL CLUTCH
Filed Feb. 12, 1931 3 Sheets-Sheet 1

Inventor:
Kenneth E. Lyman.

April 20, 1937. K. E. LYMAN 2,077,487
AUTOMATIC FREEWHEEL CLUTCH
Filed Feb. 12, 1931 3 Sheets-Sheet 2

Inventor:
Kenneth E. Lyman
By Charles H. Mills Attys.

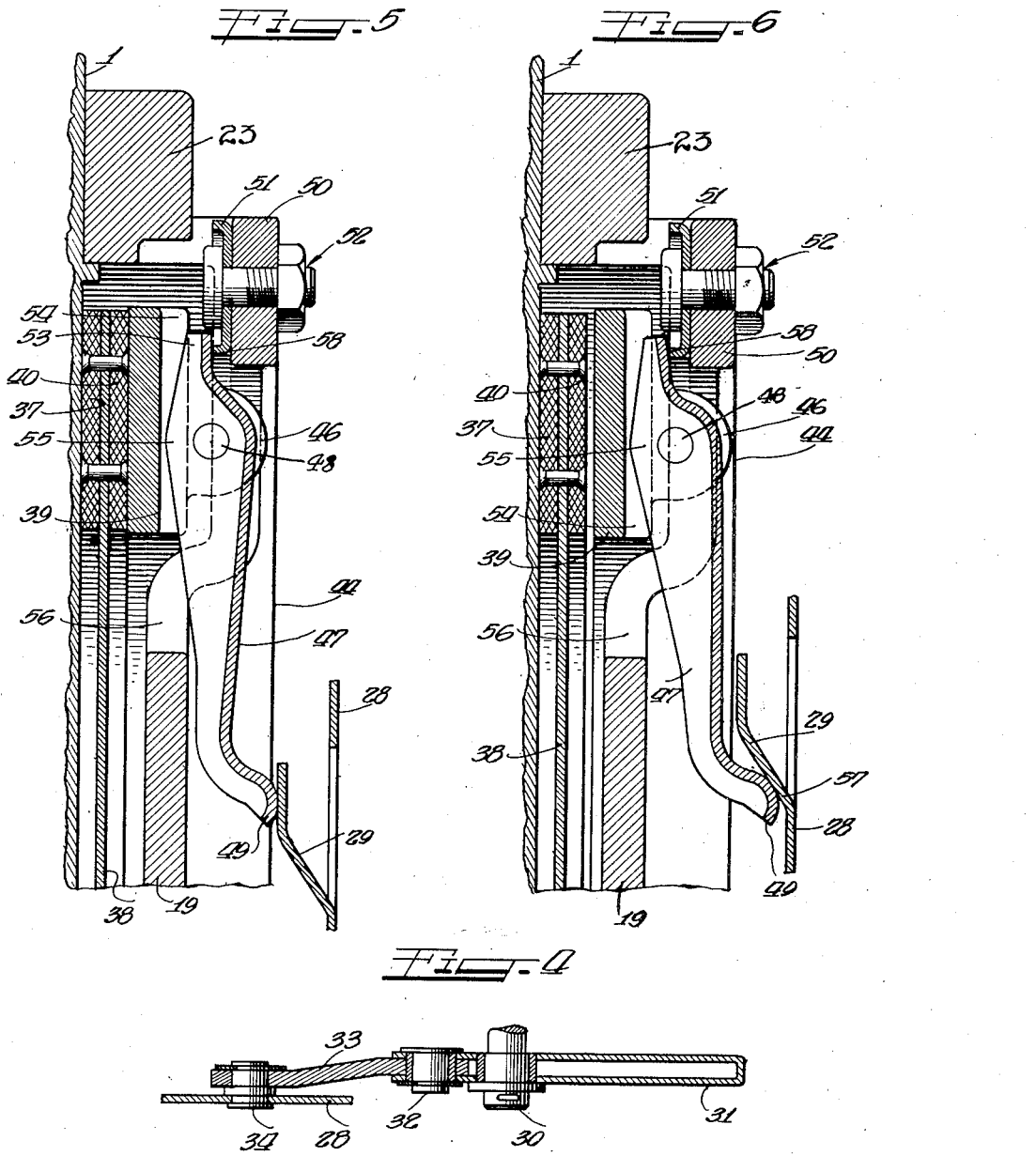

Patented Apr. 20, 1937

2,077,487

UNITED STATES PATENT OFFICE 2,077,487

AUTOMATIC FREEWHEEL CLUTCH

Kenneth E. Lyman, Chicago, Ill., assignor to Borg-Warner Corporation, Chicago, Ill., a corporation of Illinois Application February 12, 1931, Serial No. 515,168

2 Claims. (Cl. 192—48)

This invention relates to motor vehicle transmissions.

There is a decided tendency nowadays to embody one-way free wheel mechanism in automobile and the like transmissions, whereby the vehicle is capable of proceeding by virtue of its own momentum, without being subject to the usual braking effect of the engine. This results in a substantial saving of fuel and reduction in vibration of the car as a whole, with less wear on the parts. Provision is also made for rendering the free wheeling instrumentalities ineffective so that the engine will act as a brake on the vehicle if so desired.

Efforts are also being directed toward the elimination of the manually operated clutch and in the substitution therefor of a clutch which operates automatically. Motor vehicles and the like transmissions embodying this form of clutch are obviously attended by reduced vibration and a longer life, and the danger of gear stripping is obviated.

Realizing the desirability of combining free wheeling mechanism with an automatic clutch mechanism, in a transmission, the present construction has been provided as the principal object of this invention.

Another object of the invention is to provide a combination structure of the character mentioned for controlling the drive connection between the fly wheel and the main shaft of the transmission.

In carrying out the invention, a flywheel is provided centrally with a bearing in which one end of a transmission main shaft is journalled, and a clutch disc for cooperating with the flywheel is provided with a hub which is rotatably mounted on the shaft. The clutch disc is normally out of driving relation with the flywheel, and a disc surrounding said hub is provided with novel instrumentalities operated by centrifugal force in consequence of operation of the engine above the idling speed to force said clutch disc into driving engagement with the flywheel. The hub is connected with one member of an overrunning clutch, the other overrunning clutch member being drivably connected with the shaft. Thus an automatic free wheel clutch is set up between the flywheel and the shaft. Suitable means is provided for cutting out or locking out the free wheeling drive so that a positive two-way drive, also embodying the automatic clutch, can be set up between said hub and the shaft to thereby permit utilization of the engine to brake the vehicle.

The entire structure involving the clutch and free wheeling means is preferably located between the flywheel and the change speed mechanism (not shown) of the vehicle, so that no reorganization whatsoever of the latter is necessary with the use of the present invention.

It will be evident that a transmission embodying the features of my invention will result not only in a saving of fuel and reduction of vibration, and in longer life of the various operating parts, but will eliminate numerous operations by the driver which are now necessary in vehicles employing manually operated clutches.

Further objects and advantages of the invention will appear as the description proceeds.

Figure 4 is a view, partly in section and partly in elevation, taken approximately along the line indicated at IV—IV in Figure 2.

Figure 5 is an enlarged fragmentary sectional view, partly in elevation, taken on the line V—V of Figure 2 and showing a detail of the automatic clutch instrumentalities with the clutch parts engaged for simultaneous rotation.

Figure 6 is a view similar to Figure 5, but with the parts unclutched.

Figure 1:
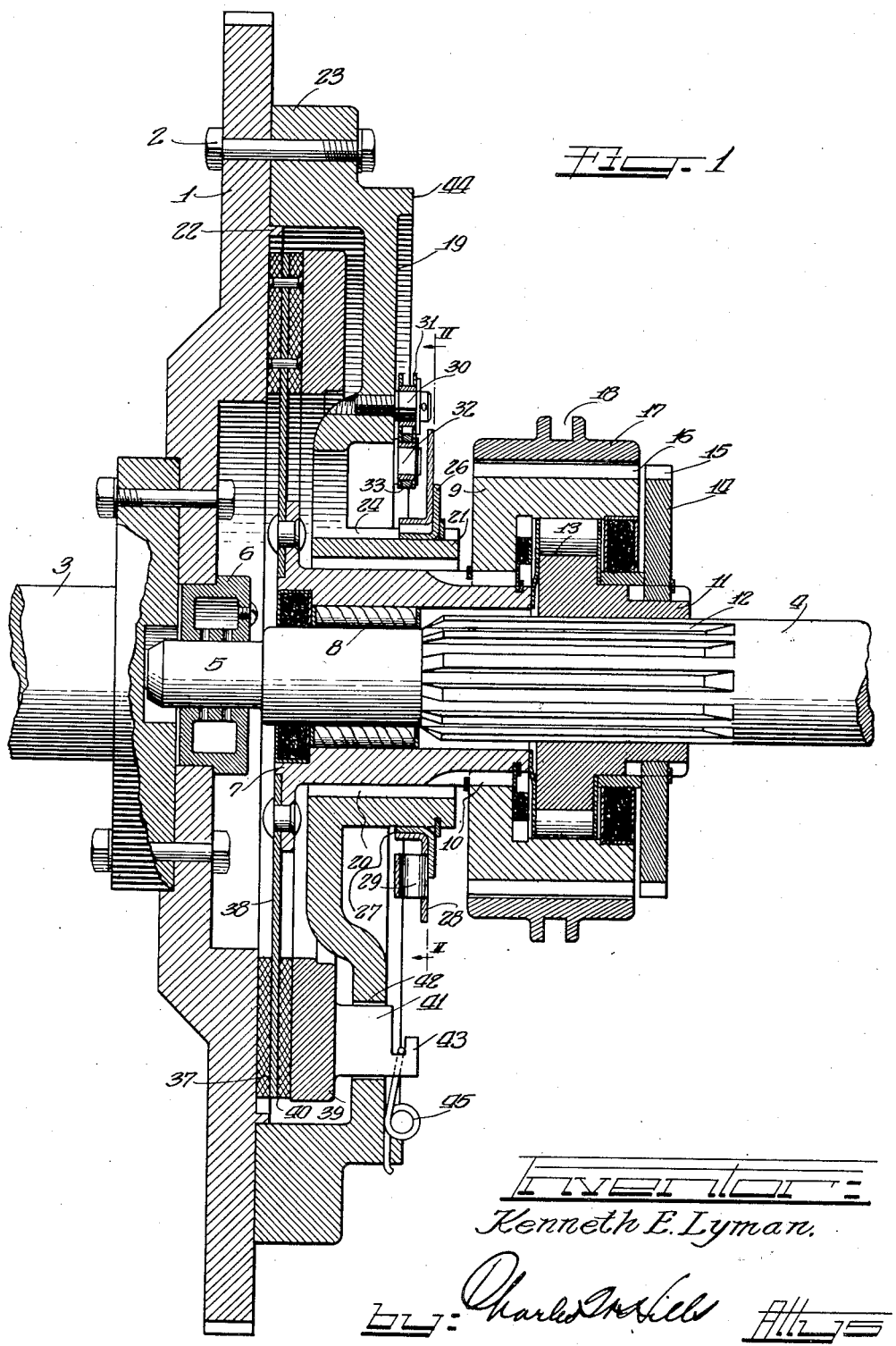
Figure 1 is a fragmentary longitudinal sectional view of the present invention, taken approximately as shown by the line I—I in Figure 2, certain parts appearing in elevation.

Referring now more particularly to the drawings, wherein the same parts are indicated by the same reference characters, a flywheel designated at 1 is bolted or otherwise suitably connected for rotation with the crank shaft 3 of a vehicle engine, not shown. A transmission main shaft 4 has one end 5 rotatable in a bearing 6 connected in any suitable manner centrally of the flywheel 1. A hub 7 is rotatably mounted by virtue of a bearing 8 about the shaft 4, and the female member 9 of an overrunning roller clutch is splined thereto at 10. The male member 11 of the overrunning clutch is splined at 12 on the shaft 4. The male member 11 is provided with the usual cam surface indicated at 13 for cooperation with the clutch rollers, which may be spring pressed, to provide an overrunning clutch construction. Suitable means in the form of rings disposed in circumferential grooves in the hub 7 serve to prevent relative axial movement between the hub 7 and the female overrunning clutch member 9. The overrunning clutch members 9 and 11 are moreover connected against appreciable relative axial movement by suitable means. It will thus be appreciated that, through the medium of the instrumentalities just noted a free wheeling drive is set up between the hub 7 and the shaft 4.

In order to provide for a lockout of the free wheeling device and thereby establish a two-way positive drive between the shaft 4 and the hub 7, a disc 14 is splined on the male member 11 of the overrunning clutch, and is provided with teeth 15 adapted for alinement with teeth 16 on the female member 9. A connecting ring 17, provided with internal teeth cooperating with the teeth 16, is provided with a circumferential groove 18 adapted to receive a shifter fork, not shown, whereby the ring 17 may be shifted so that its internal teeth interlock also with the teeth 15 of the disc 14. Suitable means may be provided to yieldably maintain the ring member 17 in either of its two positions, and a lever or like operating device may be suitably connected to the shifter fork and disposed within easy reach of the driver of a car. The disc 14 is suitably maintained against longitudinal movement relative to the clutch member 11.

Turning attention now to the clutch mechanism, it is noted that the hub 7 is surrounded by a back plate or disc 19 provided with a bore 20 of sufficient size to provide an annular space between the central flange 21 and the hub 7. The flywheel 1 is provided with a flange 22 engaged and surrounded by the peripheral flange 23 of the disc 19. Bolts 2 or the like secure the disc 19 to the flywheel 1 and thus the disc 19 is centered with respect to the flywheel 1 and the hub 7. The central flange 21 of the disc 19 is provided with a key-way 24 for receiving the rib 25 of a bearing member 26, the hub 27 of the bearing member 26 slidably receiving the plate 28, which plate is provided with a plurality of struck-up tongues 29, three being employed in this case for the purpose of illustration only.

Pivoted to the disc 19 at 30 is a plurality of weighted centrifugally operated governors or bell crank levers 31. Inasmuch as the bell crank lever and associated structure is the same in each of the three places shown, the description will be confined to one of them. The bell crank lever 31 is pivotally connected at 32 to a link 33 which in turn is pivoted at 34 to the plate 28. It is thus obvious that relative rotary movement between the plate 28 and the disc 19 is possible, the exact amount of relative movement being determined by the extent to which the lever 31 is thrown out by centrifugal force. A stop 35 on the disc 19 limits inward movement of the lever 31, and the spring 36 constantly urges the lever 31 toward the stop 35 and prevents rattling.

The hub 7 forms part of a clutch disc construction including a disc 38 having a clutch facing 37 for engaging the flywheel and a second facing 40 for engagement by the pressure plate or ring 39. The facings are made of any suitable material, such as leather. The ring 39 is provided with a plurality of projections 41 passing through corresponding openings 42 in the disc 19, whereby the ring 39 and the disc 19 are constrained for simultaneous rotation. Each projection 41 is provided with a lug forming a hook 43. The disc 19 is provided with a circumferential flange 44 to which, at points adjacent the hooks 43, springs 45 are connected. The springs 45 engage the hooks 43 in such a manner as to urge the ring 39 away from the flywheel 1.

The pressure ring 39 is provided with a plurality of sets of ears 46, and a slot 54 between the ears of each set, the number of sets corresponding with the number of tongues 29 on the plate 28, and to each set a lever 47 is pivoted at 48. Each lever 47 has a portion 55 movable in the slot 54, and an end portion 49 curved on substantially the same radius as the tongue 29, the end 49 being adapted to be cammed by the tongue 29 and thereby caused to pivot relative to the ears 46. In order to allow for proper pivotal movement of the lever 47, the disc 19 is cut out at 56.

Figures 2, 3:
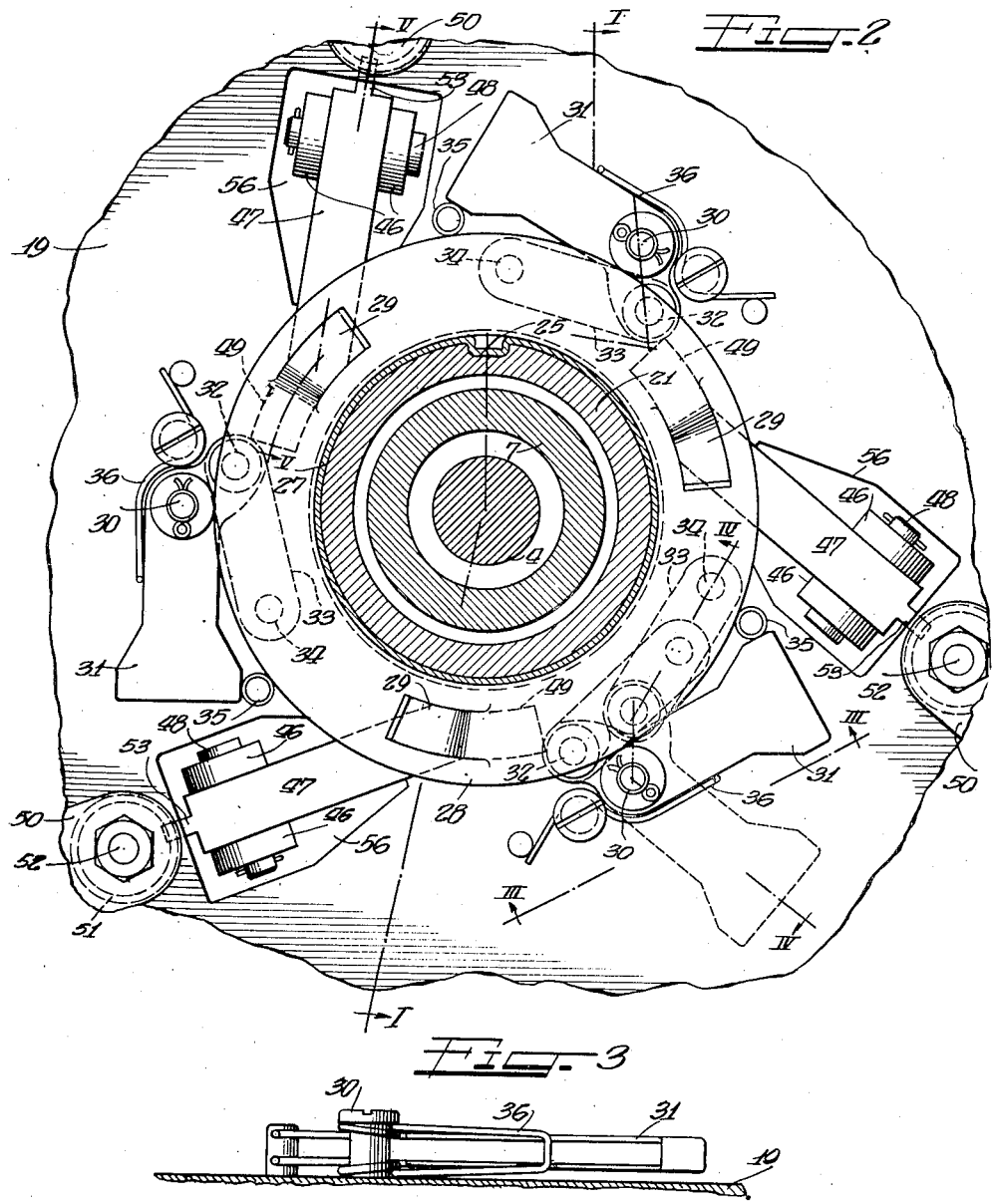
Figure 2 is a fragmentary transverse view, partly in elevation, taken approximately as indicated by the line II—II in Figure 1, certain details being omitted for the sake of clarity.
Figure 3 is a fragmentary view taken approximately as indicated by the line III—III in Figure 2.

At points corresponding to the locations of the levers 47, the disc 19 is provided with bosses 50, and a cup-shaped member 51 with its peripheral flange directed toward the flywheel 1 is connected by bolt and nut means 52 to each boss 50. Each lever 47 is provided with an extension 53 engaging the flange of the cup member 51 as shown in Figures 2, 5 and 6. The springs 45 serve to maintain this engagement constant. In view of the constant engagement between the extension 53 of the lever 47 and the cup-shaped member 51, and inasmuch as the disc 19 on which the cup-shaped member 51 is mounted is held by suitable means for movement with the flywheel 1, it will be appreciated that the portion of engagement, indicated at 58, between the extension 53 and the cup 51 serves as a pivot for the lever 47, so that in consequence of movement of the latter, the ring 39 is subjected to axial movement relative to the disc 19 and the clutch disc 38. When these parts are disengaged the clutch disc 38 is not drivably engaged with the flywheel 1. Under such circumstances, the end 49 of the lever 47 is disposed adjacent the base 57 of the tongue 29, or in contact with the body portion of the plate 28, and is maintained thus by means of the springs 45. When the clutch instrumentalities are engaged, the drive from the flywheel 1 to the shaft 4 is set up through the clutch disc 38, the hub 7 and the overrunning free wheel clutch.

The operation of the device is as follows:

When the engine is being started, or when it is idling, its speed, and consequently the speed of the flywheel 1, clutch ring 39 and disc 19 rotating therewith is insufficient to cause, by centrifugal force, the bell crank lever 31 to swing outwardly against the action of the springs 36. This being the case, the end 49 of each lever 47 occupies substantially the position shown in Figure 6, positioned with the driving clutch in inoperative position. With the engine idling, it will be appreciated that the gears in the change speed gear box, which would be located at the right, looking at Fig. 1, may be shifted at will without the necessity of any other operation on the part of the driver. When the gears have been shifted to the desired speed ratio, an engine controlled device, such as the gasoline or like accelerator or throttle, is depressed or otherwise operated to speed up the engine, and the centrifugal force consequent upon the increase in engine speed causes the weighted bell crank levers 31 to be thrown radially outwardly against the action of the springs 36, whereupon, through the medium of the linkage associated with the levers 31, the plate 28 is rotatably shifted relative to the disc 19. This results in the engagement of the end 49 of each lever 47, and a camming of said end toward the flywheel 1 by the tongue 29 until the end 49 occupies substantially the position shown in Figure 5.

During the movement of the end 49 by the tongue 29, the lever 47 is caused to pivot about the portion 58, where its extension 53 engages the cup member 51, whereupon the clutch ring 39 is forced toward the flywheel 1 until it forcibly engages the clutch facing 40 and causes the clutch facing 37 to grip the flywheel, whereby the drive is set up between the flywheel 1 and the shaft 4 as heretofore set out. As long as the speed of the engine is maintained above idling, the clutch instrumentalities will be engaged. When it is desired to coast or free wheel, it is necessary merely to reduce the driving power, whereupon the overrunning clutch will come into play so that the vehicle can run by reason of its momentum without the engine acting as a brake.

It will be noted that the reduction in engine speed is accompanied by inward movement of the weighted crank lever 31 and consequent shifting of the plate 28 relative to the disc 19, whereupon the end 49 of the lever 47 will ride down the tongue 29 on the plate 28 and cause the engine clutch instrumentalities to separate in response to action of the springs 45. When it is desired to use the engine as a brake, the engine speed is increased sufficiently to cause engagement of the engine clutch, and the connecting ring 17 shifted to interlock with the teeth 15 of the disc 14 and thereby lock out the free wheel mechanism. If desired, these operations may be reversed.

It will be seen from the foregoing that I have provided an automatic engine clutch and free wheel mechanism which is extremely simple in construction, involving very few parts, affording a low cost of manufacture, and whose arrangement is such that no reorganization of conventional gear shift mechanism is necessary.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. In a vehicle transmission mechanism having a gear housing, a transmission drive shaft having a part extending from said housing, and an engine clutch including a driven element, an overrunning clutch comprising a driving and a driven element and a releasable driving element therebetween, the first named driving element having a sleeve shaft portion surrounding said transmission drive shaft and mounted to rotate with and relative to said transmission drive shaft and directly connected to the driven element of the engine clutch, and control mechanism for said engine clutch including a shiftable member concentric with said sleeve shaft portion.

2. In a vehicle transmission mechanism having a gear housing, a transmission drive shaft having a part extending from said housing, and an engine clutch including a driven element, an overrunning clutch comprising a driving and a driven element and a releasable driving element therebetween, the first named driving element having a sleeve shaft portion mounted to rotate with and relative to said transmission drive shaft and connected to the driven element of the engine clutch, control mechanism for said engine clutch including a shiftable member concentric with said sleeve shaft portion, and control mechanism for the overrunning clutch including clutch elements on said first mentioned driving element and said driven element of said overrunning clutch and a manually shiftable clutch member cooperating with said last named clutch elements.

KENNETH E. LYMAN.